(12) United States Patent
Kulkarni et al.

(10) Patent No.: US 11,442,793 B1
(45) Date of Patent: Sep. 13, 2022

(54) FULLY DYNAMIC VIRTUAL PROXIES FOR DATA PROTECTION

(71) Applicant: EMC IP Holding Company LLC, Hopkinton, MA (US)

(72) Inventors: Gururaj Kulkarni, Bangalore (IN); Scott Quesnelle, Burlington (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 282 days.

(21) Appl. No.: 16/579,497

(22) Filed: Sep. 23, 2019

(51) Int. Cl.
*G06F 9/50* (2006.01)
*G06F 9/455* (2018.01)

(52) U.S. Cl.
CPC .......... *G06F 9/5083* (2013.01); *G06F 9/5077* (2013.01); *G06F 9/45558* (2013.01); *G06F 2009/45562* (2013.01)

(58) Field of Classification Search
CPC .. G06F 9/5083; G06F 9/5077; G06F 9/45558; G06F 2009/45562
See application file for complete search history.

(56) References Cited

U.S. PATENT DOCUMENTS

| | | | | |
|---|---|---|---|---|
| 9,639,428 | B1* | 5/2017 | Boda | G06F 11/1484 |
| 2014/0052877 | A1* | 2/2014 | Mao | H04L 12/4641 |
| | | | | 709/245 |
| 2014/0317265 | A1* | 10/2014 | James | H04L 43/0876 |
| | | | | 709/224 |
| 2019/0220369 | A1* | 7/2019 | Liu | G06F 11/1464 |

* cited by examiner

*Primary Examiner* — Jacob D Dascomb
(74) *Attorney, Agent, or Firm* — Dergosits & Noah LLP; Todd A. Noah

(57) ABSTRACT

Described is a system for utilizing fully dynamic proxies for data flow during data protection. The system determines threshold parameters for each respective virtual proxy in a plurality of virtual proxies. The system receives virtual machine protection data of each respective virtual proxy. The system detects a current data protection workload experienced by each virtual proxy operating according to its respective threshold parameters and virtual machine protection data. The system identifies at least one under-utilized virtual proxy and at least one over-utilized virtual proxy based on the current data protection workload detected on each virtual proxy. The system causes the at least one under-utilized virtual proxy to receive upcoming backup data flow before the at least one over-utilized virtual proxy.

21 Claims, 4 Drawing Sheets

FULLY DYNAMIC VIRTUAL PROXIES FOR DATA PROTECTION

TECHNICAL FIELD

This disclosure relates to data protection, and more particularly, utilizing fully dynamic virtual proxies for data flow during data protection.

BACKGROUND

The protection of virtual environments using a backup application is mostly driven by the backup application itself with a static configuration of proxy engine(s) that facilitate the data transfer between a virtual machine monitor (or hypervisor) to data protection storage. Virtualization loads in a large-scale data center are highly dynamic and a large number of virtual machines (VMs) are frequently created, updated and added to manage virtualization loads. The number of VMs creates a challenge for any data protection solution when confronted with a highly dynamic workload in virtual data centers. In contrast, if a large-scale virtual infrastructure is highly static, then designing and implementing a data protection solution is efficient because the number of VMs and their respective average growths are known. In such a static environment, the allocation of proxy engines that facilitates the data movement can be decided upfront when the data protection solution is being designed. Proxy engine resources can be tuned on the proxy engines employed in a static environment to ensure that at most only a few new proxy engines may have to be added to manage data flow. However, in a dynamic environment where the bulk of VMs may be added and updated, or the load patterns experienced by VMs can change drastically, then deciding how many proxy engines are required to cater such dynamic demands is highly challenging and complex.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
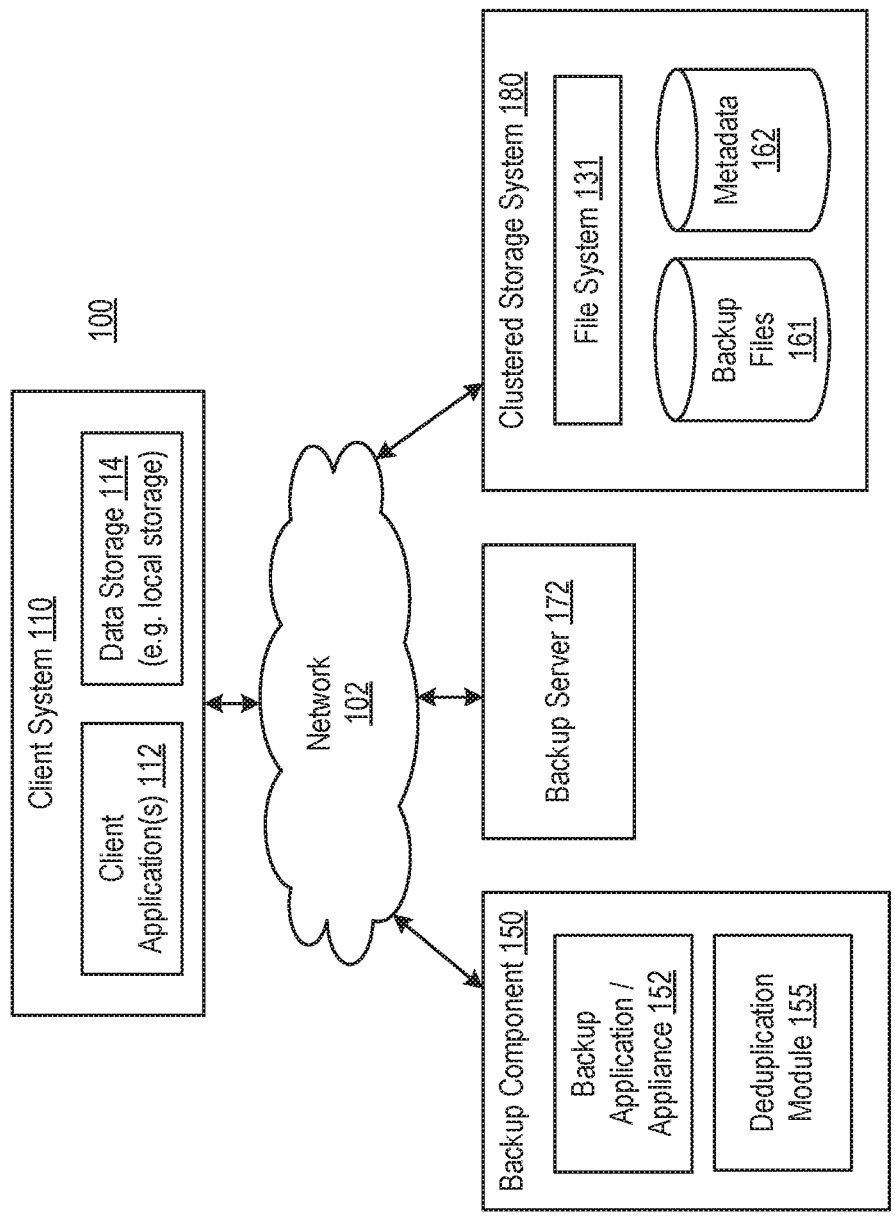
FIG. 1 is a block diagram illustrating an example operating environment for utilizing fully dynamic proxies for data flow during data protection according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

In some embodiments, described is a system (and method and computer program product) for utilizing fully dynamic proxies for data flow during data protection. The system determines threshold parameters for each respective virtual proxy in a plurality of virtual proxies. The system receives virtual machine protection data of each respective virtual proxy. The system detects a current data protection workload experienced by each virtual proxy operating according to its respective threshold parameters and virtual machine protection data. The system identifies at least one under-utilized virtual proxy and at least one over-utilized virtual proxy based on the current data protection workload detected on each virtual proxy. The system causes the at least one under-utilized virtual proxy to receive upcoming backup data flow before the at least one over-utilized virtual proxy.

In addition, the system provides many benefits for dynamic virtual environments in contrast with the limitations of conventional static environments. The system allows for automatic load balancing across multiple virtual proxies based on their load pattern. Dynamic management of virtual proxies, such that shutdown and restart of proxies that are identified as being in an idle state. Another advantage is the ability to maintain a state of a virtual proxy, by routing incoming backup date flow to the virtual proxy, in order to avoid having to monitoring the virtual proxy in an idle state. In addition, virtual proxies that have previously been shutdown can be automatically awakened prior to a scheduled flow of backup data.

In some embodiments, such a system may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a backup and clustered storage environment. For example, at least some functionality may be provided by, or implemented in connection with, various platforms for data protection platform provided by Dell EMC™ Corporation, and associated systems, methods, and components, although use of this particular platform is provided only by way of illustration and is not required.

In some embodiments, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as other types of data stores. The applications on the clients may generate new and/or modified data that is desired to be protected.

Any of the devices, including the clients, servers and hosts, in the operating environment can take the form of software, physical machines, or virtual machines (VM), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term "data" is intended to be broad in scope. Accordingly, data may include data objects (or objects), data segments such as may be produced by data stream segmentation processes, data chunks, data blocks, atomic data, emails, files, contacts, directories, sub-directories, volumes, etc. In addition, the term "backup" (or "data backups," "backed-up data," etc.) is intended to be construed broadly and includes, but is not limited to, partial backups, incremental backups, full backups, clones, snapshots, any other type of copies of data, and any combination of the foregoing. Any of the foregoing may, or may not, be deduplicated. In addition, the storage of data can employ any suitable storage technique, infrastructure, hardware (e.g. Solid State Drive (SSD), Hard Disk Drive (HDD)), or on virtual storage systems provided by a cloud service provider, etc.

More specifically, and with reference to FIG. 1, shown is a block diagram illustrating an example of an operating environment 100 for distributing phases of deduplication processing within a clustered storage environment according to one or more embodiments of the disclosure. As shown, the environment 100 may include a client system 110, backup system 150, backup server 172, and a clustered storage system 180. It should be noted that the components of operating environment 100 may interact via a network 102, which may be any type of wired or wireless network including a local area network (LAN), a wide area network (WAN), or a direct communication link, or other suitable connection.

As shown, the operating environment 100 may include a client or client system (or computer, or device) 110 that may be associated with a client or customer of a data backup and protection service, and a backup system 150 that may be associated with a data backup and protection service provider. For example, the client system 110 may provide computing resources (e.g. webservers, databases, etc.) for users (e.g. website visitors) of the customer, data from which may be protected by the backup and data protection service provider. Accordingly, the client system 110 may act as a client from which backups are performed. In some embodiments, the client system 110 may comprise a virtual machine. In addition, the client system 110 may host one or more client applications 112, and may include data storage 114, as well as an interface for communicating with other systems and devices, such as the backup system 150. In general, the client applications 112 may create new and/or modified data that is desired to be protected. As such, the client system 110 is an example of a host device. The data storage 114 can be used to store client data, which may, along with the client system 110 (e.g. client applications 112) may be backed up using the backup system 150. As further described herein, components of the client system 110 (e.g. client applications, 112, data storage 114, etc.) may be a data source, or be associated with, one or more data sources such as a database, VM, storage device, etc. In addition, components of the client system 110 may be data sources that are associated with the client system 110, but reside on separate servers such as a data server, or a cloud-computing infrastructure. The client system 110 may include a backup client application, or plug-in application, or API that cooperates with backup system 150, to create backups of client data. The backed-up data can also be restored to the client system 110.

In one embodiment, backup component 150 may represent one or more components of a Data Domain Restorer (DDR)-based deduplication storage system, and backup server 172 may be implemented in conjunction with a Data Domain deduplication storage server provided by Dell EMC for use with DDR storage devices. For example, the backup server 172 may be a stand-alone entity, or can be an element of the clustered storage system 180. In some embodiments, the backup server 172 may be a Dell EMC Avamar server or a Dell EMC Networker server, although no particular server is required, and other backup and storage system configurations are contemplated.

The backup component 150, may include a backup application (or appliance) 152 that performs (or manages, coordinates, etc.) the creation and restoration of data that may be backed-up. For example, data to be backed-up from the client system 110 may be communicated from the client system 110 to the backup application 152 for initial processing, after which the processed data is uploaded from the backup application 152 for storage at the clustered storage system (e.g. as backup data 161). In some embodiments, the backup application 152 may cooperate with a backup client application of the client system 110 to back up client data to the clustered storage system 180. A backup application 152 may also cooperate with a backup client application to restore backup data from the clustered storage system 180 to the client system 110. In some embodiments, the backup application 152 may be a part of, or work in conjunction with, a storage appliance. For example, the storage appliance may include a Dell EMC data domain appliance, although any suitable appliance is contemplated. In addition, the backup application 152 may provide a variety of useful functionalities such as source-side data deduplication, data compression, and WAN optimization boost performance and throughput while also possibly reducing the consumption and cost of network bandwidth and cloud storage capacity. One, some, or all, of these functions of the backup application 152 may be performed using deduplication logic via deduplication module 155. For example, the deduplication module 155 can provide data segmentation, as well as in-flight encryption as the data is sent by the storage application 152 to the clustered storage system 180. However, as further described herein, in some embodiments, data deduplication may be performed entirely within the clustered storage environment 180. It should be noted that the backup application (or storage appliance) 152 can be implemented in various forms, such as a virtual, physical, or native public cloud appliance to fit the requirements of a particular configuration, and the backup application 152 can be used with various types of data protection environments, including public and private object storage clouds.

The clustered storage system 180 (as further described herein) may store backup files 161 (or backup objects) within a one or more nodes (as further described herein). As shown, the clustered storage system 180 may also store metadata 162 for (or associated with) the backup files 161, and one or more instances of a filesystem 131 that catalogs backup files and other data residing in the clustered environment. In general, the storage of backup files 161 may be configured to store client system 110 data backups that can be restored in the event of a loss of data.

Figure 2:
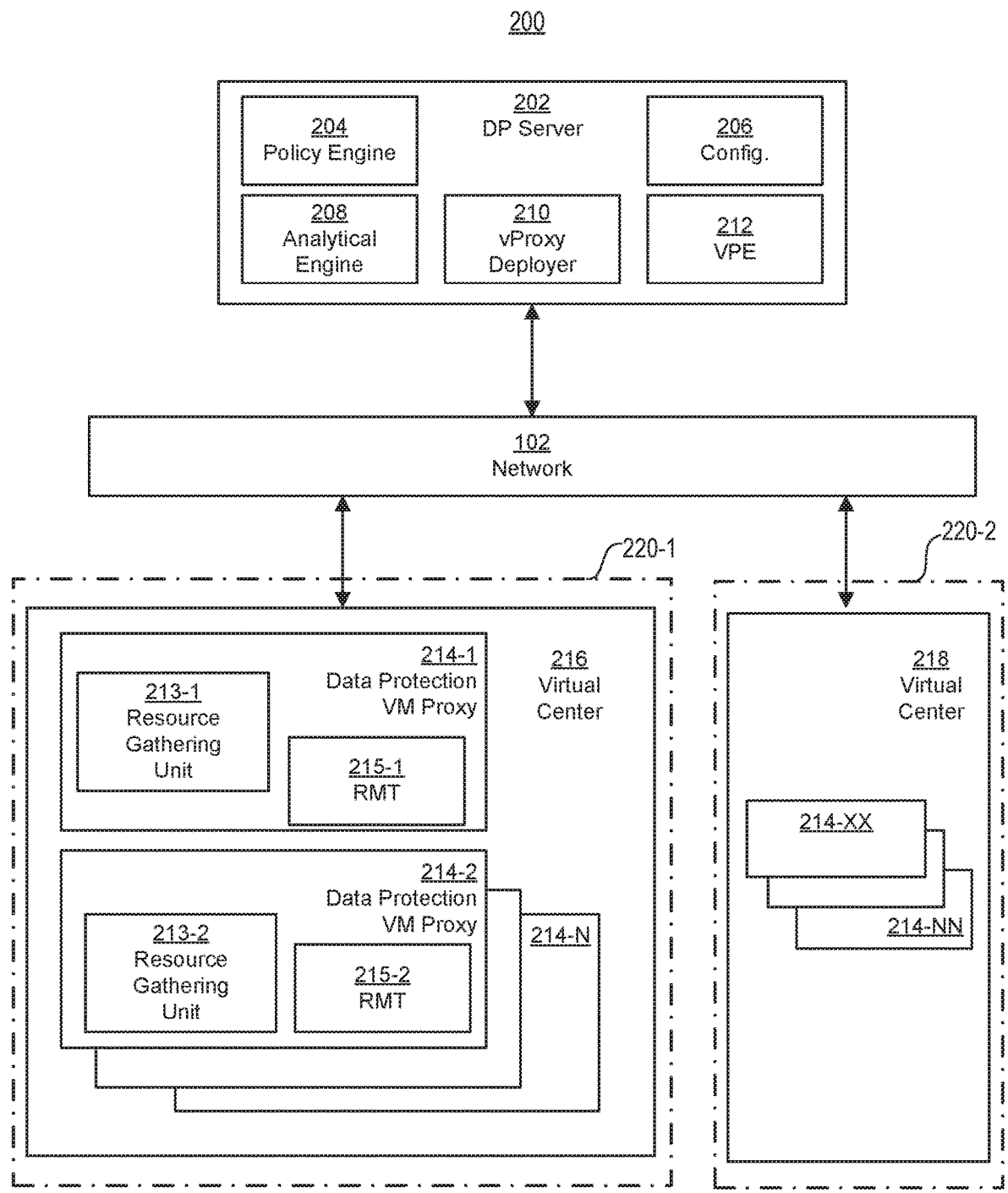
FIG. 2 is a block diagram illustrating an example environment for dynamic virtual proxies for data flow during data protection according to one or more embodiments of the disclosure.

FIG. 2 is a block diagram illustrating an example environment for dynamic virtual proxies for data flow during data protection according to one or more embodiments of the disclosure.

According to an embodiment, as shown in FIG. 2, each virtual center 216, 218 has multiple Virtual Machine Proxies 214-1, 214-2 . . . 214-N, 214-XX . . . 214-NN ("VM Proxies 214-1 . . . 214-NN" or "virtual proxies"), which may be deployed to the virtual centers 216, 218 by a proxy deployer 210 and distributed across different, clustered nodes. The proxy deployer 210 runs inside a data protection server 202 and may deploy and register newly instantiated VM Proxies that each include a newly instantiated resource gathering unit 213-1, 213-2 . . . and a dynamic resource monitor 215-1, 215-2 . . . . In addition, a policy engine 204 may automatically discover the settings of a new VM Proxy and begin leveraging the new VM Proxy to handle new workload demands that are in queue of backup data that is to be protected, such as a portion of upcoming backup data flow at a first position of a queue that organizes data from one or more virtual machines that are being backed up.

Each respective VM Proxy 214-1 . . . 214-NN broadcasts virtual machine protection data to indicate a current I/O, CPU and memory resource utilization as well the number of virtual machines the respective VM Proxy 214-1 . . . 214-NN is currently protecting during a data protection policy run. Each VM Proxy 214-1 . . . 214-NN may have its own resource information gathering unit 213-1, 213-2 . . . to gather the details about the virtual center's 216, 218 environment and topology. The gathered data may be cached locally for retrieval by a virtual machine probe engine 212 of a data protection server ("DPS") 202. In addition, each VM Proxy 214-1 . . . 214-NN includes a dynamic resource monitor ("RMT") 218-1, 218-2 . . . The RMT 215-1, 215-2 . . . captures the CPU, Memory, IO and network utilization details for the virtual machine protection data. The virtual machine protection data may also be cached locally for retrieval by the virtual proxy probe engine 212. The RMT 215-1, 215-2 . . . may also determine the current number of virtual machines being protected by the respective VM Proxy 214-1 . . . 214-NN in which the RMT 218-1, 218-2 . . . is located The virtual machine probe engine 212 probes the VM Proxies 214-1 . . . 214-NN of each virtual center 216, 218 and collects their broadcasted virtual machine protection data and locally cached data. For example, additional collected data may include: a backup method being utilized (hotadd or network block device or both), topology information (e.g. a number of small computer interface controllers, data store details, and VM Proxy resource details) and proxy state (i.e. idle, running, shutdown). For example, a hotadd backup method attaches one or more disks of a virtual machine(s) to a select VM Proxy then the select VM Proxy moves the data from the attached disks to be backed up. It is understood that such discovery and collection may be performed by the virtual machine probe engine 212 over a representational state transfer ("REST") API 220-1, 220-2 provided by the VM Proxies 214-1 . . . 214-NN.

During initialization of each VM Proxy 214-1 . . . 214-NN, a configuration module 206 running at the DPS 202 sets certain threshold parameters for 10, CPU, memory utilization—as well as a maximum number of virtual machines to be protected—for each specific VM Proxy 214-1 . . . 214-NN. In addition, the configuration module 206 may set initial threshold parameters for a new VM Proxy before the new VM Proxy is deployed. It is understood that each VM Proxy 214-1 . . . 214-NN may have different threshold parameters or similar threshold parameters.

An analytical engine 208 runs on the DPS 202, which gathers the information of one or more VM Proxies 214-1 . . . 214-NN by contacting the virtual proxy probe engine 212. If the analytical engine 308 detects an over-utilized VM Proxy and there are additional virtual machines with data that has yet to be protected, the analytical engine 208 will distribute the load of the upcoming backup data flow to available VM Proxies 214-1 . . . 214-NN that are under-utilized. In one example, for every VM Proxy 214-1 . . . 214-NN, the analytical engine 208 checks the memory and CPU utilization against the threshold parameters. If any utilization metric exceeds a threshold parameter, the analytical engine 208 triggers load balancing—of upcoming backup data flow of virtual machine backup data—among available, under-utilized VM Proxies 214-1 . . . 214-NN. The analytical engine 208 will always attempt to load balance with existing, available VM Proxies 214-1 . . . 214-NN. However, if there are no VM Proxies 214-1 . . . 214-NN available, then the VM Proxy deployer 210 deploys a new VM Proxy automatically to cater to new upcoming backup data flow demands that are in queue.

The analytical engine 208 tracks the under-utilized and over-utilized VM Proxies 214-1 . . . 214-NN which may be determined with respect to their current data protection workload (i.e. each respective VM proxy operating according to its virtual machine protection data and threshold parameters). Based on identifying the current utilization of each VM Proxy 214-1 . . . 214-NN, the data protection server 202, and its modules 204, 206, 208, 210, implement load balancing by automatically distributing the load created by incoming and queued backup data flow generated from virtual machines during a data protection policy run. The analytical engine 208 utilizes the information from the virtual machine probe engine 212 to perform automatic load balancing and fully dynamic proxy management.

The analytical engine 208 maintains the state of each VM Proxy 214-1 . . . 214-NN by determining whether a VM Proxy 214-1 . . . 214-NN is in an idle state (i.e. not involved in data protection policy run), a running state (i.e. performing backup/restore operations) or a shutdown state. For example, if a particular VM Proxy 214-1 . . . 214-NN is an idle state, the analytical engine 208 confirms that the idle VM Proxy is not scheduled to receive any backup data flow during an upcoming period of time (e.g. for the next 60 minutes). The analytical engine 208 may set a wake-up time for the idle VM Proxy, such as 5 minutes before the next batch of incoming backup data flow. The analytical engine 208 may set also set an alarm to wake up the idle VM Proxy if unscheduled backup data flow (e.g. manual workflow or adhoc backup) arrives which requires the idle VM Proxy. The analytical engine 208 may also delete or shut-down an idle VM Proxy.

The analytical engine 208 may process key metrics in order to decide that a load balancing action needs to be triggered. For example, if the available network bandwidth is 10 Gbps and the number of network interface controllers is 1, then a single VM Proxy 214-1 . . . 214-NN could be saturated by upcoming backup data flow at the speed of 1250 MB/sec. If the overhead of the VM Proxy 214-1 . . . 214-NN is estimated by the analytical engine 208 at 10%, then saturation occurs at a slower data flow speed of 1000 MB/sec. In addition, the analytical engine 208 may also detect 10 hotadd sessions, with each consuming around 100 MB/sec, such that adding another hotadd session would decrease the overall throughput for the VM Proxy 214-1 . . . 214-NN. Based on the key metrics, the analytical engine 208 will decide the load balancing. If there are no existing VM Proxies 214-1 . . . 214-NN that are currently available to load balance the hotadd sessions, then the analytical engine 208 informs the VM Proxy deployer 210 to automatically deploy a new VM Proxy.

In another example, the analytical engine 208 may periodically probe CPU utilization of one or more VM Proxies 214-1 . . . 214-NN. If the CPU utilization is consistently exceeding 85% over a pre-defined 15-30 minute window, then load balancing may be triggered. Similarly, if memory utilization is greater than 85% continuously over a pre-defined period of time, then the analytical engine 208 will attempt to load balance with other existing, available VM Proxies 214-1 . . . 214-NN. Otherwise, if none are available, the analytical engine 208 informs the VM Proxy deployer 210 to automatically deploy a new VM Proxy.

According to another example, a VM Proxy 214-1 . . . 214-NN by default may have threshold parameters for a maximum of 13 hotadd sessions and 13 network block device sessions. If a number of upcoming hotadd and NBD sessions starts increasing beyond these respective values, then the analytical engine 208 will attempt to load balance with other existing, available VM Proxies 214-1 . . . 214-NN. Otherwise, if none are available, the analytical engine 208 informs the VM Proxy deployer 210 to automatically deploy a new VM Proxy.

According to another example, increasing disk latency while performing a virtual machine backup by a VM Proxy 214-1 . . . 214-NN may be used as an input/output operations per second (IOPS) factor to decide the load balancing. If a service time to process the I/O from any data store increases beyond 20 ms latency, then the analytical engine 208 will attempt to load balance with other existing, available VM Proxies 214-1 . . . 214-NN. Otherwise, if none are available, the analytical engine 208 informs the VM Proxy deployer 210 to automatically deploy a new VM Proxy.

Figure 3:
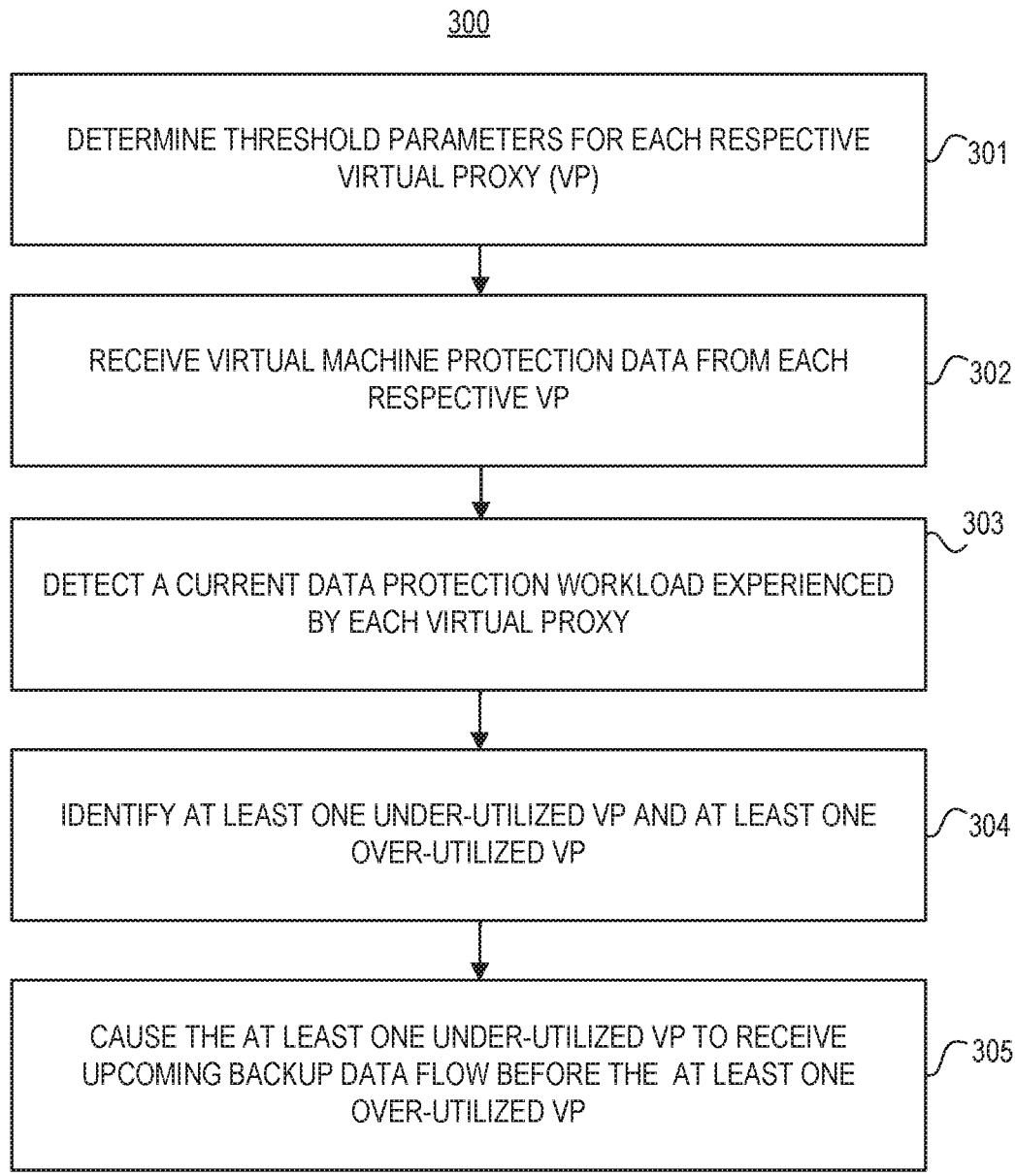
FIG. 3 is a flow diagram illustrating an example method for dynamic virtual proxies for data flow during data protection according to one or more embodiments of the disclosure.

FIG. 3 is a flow diagram illustrating an example method 300 for dynamic virtual proxies for data flow during data protection according to one or more embodiments of the disclosure.

At step 301, a data protection server ("DPS") determines threshold parameters for each respective virtual proxy (i.e. VM Proxy) in a plurality of virtual proxies. The threshold parameters comprise a threshold measurement of proxy resource utilization data and a maximum allowed number of protected virtual machines. For example, the DPS may initially configure each respective virtual proxy with initial threshold parameters before the virtual proxy is deployed.

At step 302, the DPS receives virtual machine protection data of each respective virtual proxy. The virtual machine protection data comprises current proxy resource utilization data and a number of virtual machines currently being protected by the respective virtual proxy. For example, the virtual machine protection data may indicate CPU utilization based on a number of CPUs, CPU speed and the type of virtual proxy operating system. The virtual machine protection data may also indicate memory utilization based on physical memory allocation, an amount of reserved memory and the type of virtual proxy operating system.

At step 303, the DPS detects a current data protection workload experienced by each virtual proxy operating according to its respective threshold parameters and virtual machine protection data. For example, the DPS may detect current available network bandwidth is 10 Gbps. The DPS may detect that there are currently 10 hotadd sessions, with each consuming 100 MB/sec. It is understood that the current data protection workload is based on received virtual machine protection data and the virtual proxy's threshold parameters set during configuration.

At step 304, the DPS identifies at least one under-utilized virtual proxy and at least one over-utilized virtual proxy. The DPS identifies and under (or over)-utilized virtual proxy based on the current data protection workload detected on each virtual proxy.

At step 305, the DPS causes the at least one under-utilized virtual proxy to receive upcoming backup data flow before the at least one over-utilized virtual proxy. For example, if a new virtual proxy is deployed, then the DPS identifies incoming backup data flow from one or more virtual machines protected by the plurality of virtual proxies and routes the incoming backup data flow to the new virtual proxy. It is understood that incoming backup data flow may be queued for release to the one or more virtual proxies. In another example, the DPS identifies, as an under-utilized virtual proxy, an idle virtual proxy that has not received any backup data flow during a pre-determined workload duration and deletes the idle virtual proxy.

As noted, the operations (or steps) shown in the above processes are not necessarily performed in the order indicated and may be performed in parallel, as a single operation, or as multiple operations. For example, the system may determine a particular node already stores a backup file associated with the backup data before, concurrently with, or after, initiating the first phase deduplication.

Figure 4:
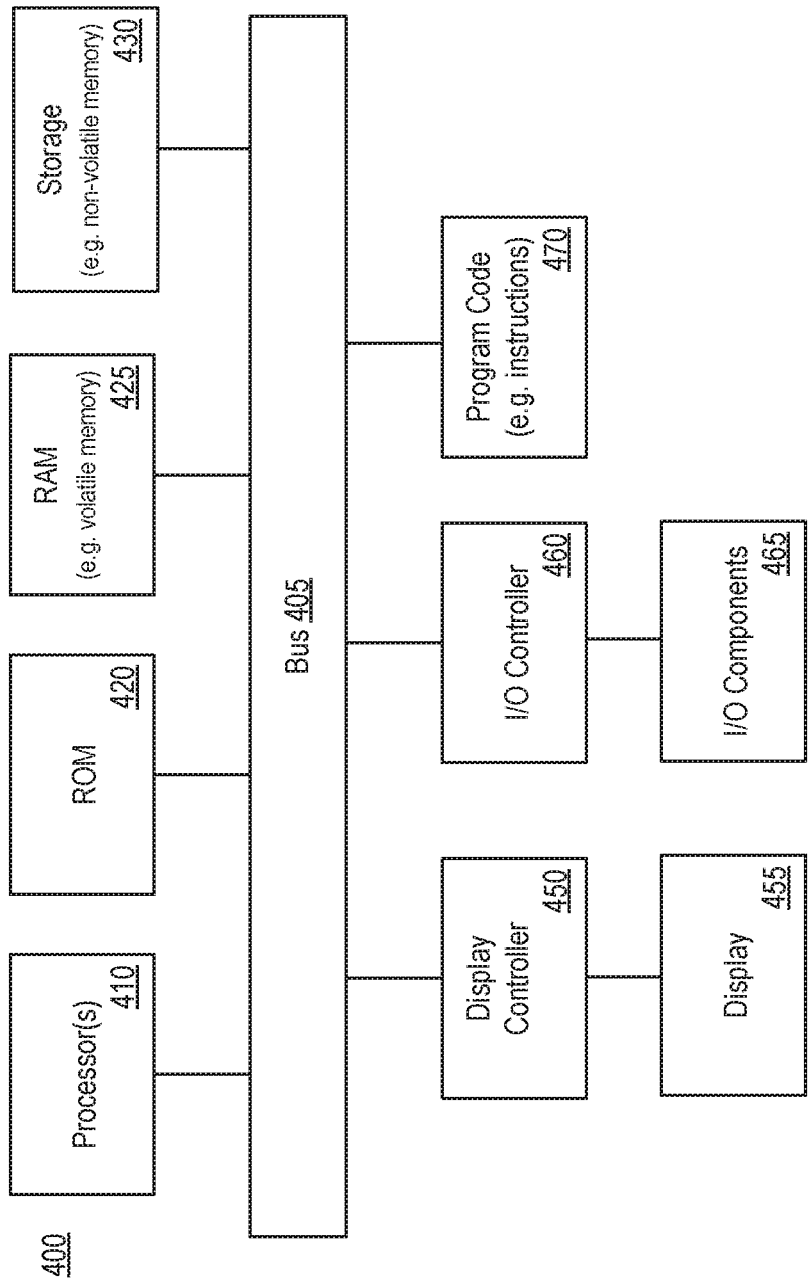
FIG. 4 is a block diagram illustrating an example of a computing system that may be used in conjunction with one or more embodiments of the disclosure.

FIG. 4 shows a block diagram of an example of a computing system that may be used in conjunction with one or more embodiments of the disclosure. For example, computing system 400 (or system, or server, or computing device, or device) may represent any of the devices or systems (e.g. clustered storage system 180, node 212, CWB 206, CSP 210, etc.) described herein that perform any of the processes, operations, or methods of the disclosure. Note that while the computing system 400 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 400 may include a bus 405 which may be coupled to a processor 410, ROM (Read Only Memory) 420, RAM (or volatile memory) 425, and storage (or non-volatile memory) 430. The processor(s) 410 may retrieve stored instructions from one or more of the memories 420, 425, and 430 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein.

As referred to herein, for example, with reference to the claims, a processor may include one or more processors. Moreover, the one or more processors 410 may perform operations in an on-demand or "cloud computing" environment or as a service (e.g. within a "software as a service" (SaaS) implementation). Accordingly, the performance of operations may be distributed among the one or more processors 410, whether residing only within a single machine or deployed across a number of machines. For example, the one or more processors 410 may be located in a single geographic location (e.g. within a home environment, an office environment, or a server farm), or may be distributed across a number of geographic locations. The RAM 425 may be implemented as, for example, dynamic RAM (DRAM), or other types of memory that require power continually in order to refresh or maintain the data in the memory. Storage 430 may include, for example, magnetic, semiconductor, tape, optical, removable, non-removable, and other types of storage that maintain data even after power is removed from the system. It should be appreciated that storage 430 may be remote from the system (e.g. accessible via a network).

A display controller 450 may be coupled to the bus 405 in order to receive display data to be displayed on a display device 455, which can display any one of the user interface features or embodiments described herein and may be a local or a remote display device. The computing system 400 may also include one or more input/output (I/O) components 465 including mice, keyboards, touch screen, network interfaces, printers, speakers, and other devices. Typically, the input/output components 465 are coupled to the system through an input/output controller 460.

Program code 470 may represent any of the instructions, applications, software, libraries, toolkits, modules, components, engines, units, functions, logic, etc. as described herein (e.g. clustered storage system 180, node 212, CWB 206, CSP 210, etc.). Program code 470 may reside, completely or at least partially, within the memories described herein (e.g. non-transitory computer-readable media), or within a processor during execution thereof by the computing system. Program code 470 may include both machine code, such as produced by a compiler, and files containing higher-level or intermediate code that may be executed by a computing system or other data processing apparatus (or machine) using an interpreter. In addition, program code 470 can be implemented as software, firmware, or functional circuitry within the computing system, or as combinations thereof. Program code 470 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that references to ordinal numbers such as "first," "second," "third," etc., may indicate an adjective for an element (e.g. any noun in the application). The use of ordinal numbers does not necessarily imply or create any particular ordering of the elements nor limit any element to being only a single element unless expressly disclosed, such as by the use of the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements. In addition, the use of the term "or" indicates an inclusive or (e.g. and/or) unless otherwise specified. For example, the phrase "at least one of x, y, or z" means any one of x, y, and z, as well as any combination thereof. In addition, the term "based on" is used to describe one or more factors that affect a determination. These terms do not foreclose additional factors that may affect a determination. For example, the phrase "determining A based on B" includes B being a factor that affects the determination of A, and does not foreclose the determination of A from also being based on C. However, in other instances, A may be determined based solely on B, such as by the use of the terms "only," "solely," and other such terminology. In addition, the term "approximately" or "substantially" may be used herein and may be interpreted as "as nearly as practicable," "within technical limitations," and the like.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:
1. A system comprising:
one or more processors; and
a non-transitory computer readable medium storing a plurality of instructions, which when executed, cause the one or more processors to:
determine one or more threshold parameters for each virtual proxy in a plurality of virtual proxies, each virtual proxy providing data protection services for a plurality of virtual machines;
receive virtual machine protection data of each respective virtual proxy indicating current utilization of data protection services of each respective virtual proxy by the plurality of virtual machines associated with each respective virtual proxy;
identify, based on the virtual machine protection data received for each virtual proxy, at least one under-utilized virtual proxy and at least one over-utilized virtual proxy, the at least one under-utilized virtual proxy having virtual machine protection data that is less than the one or more threshold parameters for the at least one under-utilized virtual proxy; and
cause the at least one under-utilized virtual proxy to receive upcoming backup data flow before the at least one over-utilized virtual proxy.

2. The system of claim 1, wherein the virtual machine protection data comprises current proxy resource utilization data and a number of virtual machines currently being protected by the respective virtual proxy.

3. The system of claim 2, wherein the threshold parameters comprise a threshold measurement of proxy resource utilization data and a maximum allowed number of protected virtual machines.

4. The system of claim 1, wherein identifying the at least one under-utilized virtual proxy and the at least one over-utilized virtual proxy comprises:
   determining all respective virtual proxies are over-utilized;
   instantiating a new virtual proxy to be added to the plurality of virtual proxies in response to the determining all respective virtual proxies are over-utilized; and
   identifying the new virtual proxy as the under-utilized virtual proxy.

5. The system of claim 4, wherein causing the at least one under-utilized virtual proxy to receive upcoming data flow before the at least one over-utilized virtual proxy comprises:
   identifying incoming backup data flow from one or more virtual machines protected by the plurality of virtual proxies; and
   routing the incoming backup data flow to the new virtual proxy.

6. The system of claim 1, wherein identifying the at least one under-utilized virtual proxy and the at least one over-utilized virtual proxy comprises:
   identifying, as an under-utilized virtual proxy, an idle virtual proxy that has not received any backup data flow during a pre-determined workload duration; and
   deleting the idle virtual proxy from the plurality of virtual proxies.

7. The system of claim 6, wherein identifying, as an under-utilized virtual proxy, an idle virtual proxy further comprises:
   determining the idle virtual proxy is not scheduled to receive any incoming backup data flow during a pre-determined upcoming interval.

8. A method comprising:
   determining one or more threshold parameters for each virtual proxy in a plurality of virtual proxies, each virtual proxy providing data protection services for a plurality of virtual machines;
   receiving virtual machine protection data of each respective virtual proxy indicating current utilization of data protection services of each respective virtual proxy by the plurality of virtual machines associated with each respective virtual proxy;
   identifying, based on the virtual machine protection data received for each virtual proxy, at least one under-utilized virtual proxy and at least one over-utilized virtual proxy, the at least one under-utilized virtual proxy having virtual machine protection data that is less than the one or more threshold parameters for the at least one under-utilized virtual proxy; and
   causing the at least one under-utilized virtual proxy to receive upcoming backup data flow before the at least one over-utilized virtual proxy.

9. The method of claim 8, wherein the virtual machine protection data comprises current proxy resource utilization data and a number of virtual machines currently being protected by the respective virtual proxy.

10. The method of claim 9, wherein the threshold parameters comprise a threshold measurement of proxy resource utilization data and a maximum allowed number of protected virtual machines.

11. The method of claim 8, wherein identifying at least one under-utilized virtual proxy and at least one over-utilized virtual proxy comprises:
    determining all respective virtual proxies are over-utilized;
    instantiating a new virtual proxy to be added to the plurality of virtual proxies in response to the determining all respective virtual proxies are over-utilized; and
    identifying the new virtual proxy as the under-utilized virtual proxy.

12. The method of claim 11, wherein causing the at least one under-utilized virtual proxy to receive upcoming data flow before the at least one over-utilized virtual proxy comprises:
    identifying incoming backup data flow from one or more virtual machines protected by the plurality of virtual proxies; and
    routing the incoming backup data flow to the new virtual proxy.

13. The method of claim 8, wherein identifying at least one under-utilized virtual proxy and at least one over-utilized virtual proxy comprises:
    identifying, as an under-utilized virtual proxy, an idle virtual proxy that has not received any backup data flow during a pre-determined workload duration; and
    deleting the idle virtual proxy from the plurality of virtual proxies.

14. The method of claim 13, wherein identifying, as an under-utilized virtual proxy, an idle virtual proxy further comprises:
    determining the idle virtual proxy is not scheduled to receive any incoming backup data flow during a pre-determined upcoming interval.

15. A computer program product comprising a non-transitory computer-readable medium having a computer-readable program code embodied therein to be executed by one or more processors, the program code including instructions to:
    determine one or more threshold parameters for each virtual proxy in a plurality of virtual proxies, each virtual proxy providing data protection services for a plurality of virtual machines;
    receive virtual machine protection data of each respective virtual proxy indicating current utilization of data protection services of each respective virtual proxy by the plurality of virtual machines associated with each respective virtual proxy;
    identify, based on the virtual machine protection data received for each virtual proxy, at least one under-utilized virtual proxy and at least one over-utilized virtual proxy, the at least one under-utilized virtual proxy having virtual machine protection data that is less than the one or more threshold parameters for the at least one under-utilized virtual proxy; and
    cause the at least one under-utilized virtual proxy to receive upcoming backup data flow before the at least one over-utilized virtual proxy.

16. The computer program product of claim 15, wherein the virtual machine protection data comprises current proxy resource utilization data and a number of virtual machines currently being protected by the respective virtual proxy.

17. The computer program product of claim 15, wherein the threshold parameters comprise a threshold measurement of proxy resource utilization data and a maximum allowed number of protected virtual machines.

18. The computer program product of claim 15,
wherein identifying at least one under-utilized virtual proxy and at least one over-utilized virtual proxy comprises:
determining all respective virtual proxies are over-utilized;
instantiating a new virtual proxy to be added to the plurality of virtual proxies in response to the determining all respective virtual proxies are over-utilized; and
identifying the new virtual proxy as the under-utilized virtual proxy.

19. The computer program product of claim 15, wherein causing the at least one under-utilized virtual proxy to receive upcoming data flow before the at least one over-utilized virtual proxy comprises:
identifying incoming backup data flow from one or more virtual machines protected by the plurality of virtual proxies; and
routing the incoming backup data flow to the new virtual proxy.

20. The computer program product of claim 15, wherein identifying at least one under-utilized virtual proxy and at least one over-utilized virtual proxy comprises:
identifying, as an under-utilized virtual proxy, an idle virtual proxy that has not received any backup data flow during a pre-determined workload duration; and
deleting the idle virtual proxy from the plurality of virtual proxies.

21. The computer program product of claim 20, wherein identifying, as an under-utilized virtual proxy, an idle virtual proxy further comprises:
determining the idle virtual proxy is not scheduled to receive any incoming backup data flow during a pre-determined upcoming interval.

* * * * *